United States Patent
Maasi et al.

(10) Patent No.: US 9,191,124 B2
(45) Date of Patent: Nov. 17, 2015

(54) OPTO-ISOLATOR WITH CORRECTION CIRCUIT

(71) Applicant: Avago Technologies General IP (Singapore) Pte. Ltd, Singapore (SG)

(72) Inventors: Gopinath Maasi, Singapore (SG); Thiam Siew Tay, Singapore (SG); Soo Kiang Ho, Singapore (SG); Peng Siang Seet, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 409 days.

(21) Appl. No.: 13/660,296

(22) Filed: Oct. 25, 2012

(65) Prior Publication Data

US 2014/0119739 A1    May 1, 2014

(51) Int. Cl.
*H04B 10/00* (2013.01)
*H04B 10/80* (2013.01)
*H04B 1/58* (2006.01)

(52) U.S. Cl.
CPC .............. *H04B 10/802* (2013.01); *H04B 1/587* (2013.01)

(58) Field of Classification Search
CPC .................................. H04B 1/587; H04B 10/00
USPC .................. 250/551, 214 R, 214 C, 205, 552; 398/140, 158, 162, 164
See application file for complete search history.

(56) References Cited

U.S. PATENT DOCUMENTS

| | | | | |
|---|---|---|---|---|
| 3,772,514 | A | * | 11/1973 | Sunderland .................... 250/551 |
| 4,417,099 | A | | 11/1983 | Pierce |
| 6,777,703 | B2 | | 8/2004 | Morikawa |
| 2010/0109545 | A1 | | 5/2010 | Eiring et al. |
| 2011/0044691 | A1 | | 2/2011 | Jung |
| 2014/0119740 | A1 | * | 5/2014 | Tay et al. ....................... 398/158 |

FOREIGN PATENT DOCUMENTS

EP            0828359         3/1998

* cited by examiner

*Primary Examiner* — Kevin Pyo

(57) ABSTRACT

An opto-isolator with a correction circuit is disclosed. The correction circuit is configured to make adjustments for degradation of the light source of the opto-isolator. The correction circuit may comprise a photodetector for detecting degradation of the light source of the opto-isolator. When the light source degrades below a predetermined level, the correction circuit may be configured to make adjustments.

21 Claims, 5 Drawing Sheets

OPTO-ISOLATOR WITH CORRECTION CIRCUIT

BACKGROUND

A galvanic isolator provides a means for moving a signal from one electrical circuit to another electrical circuit in a control system when the two electrical circuits must otherwise be electrically isolated from one another. Usually the two electrical circuits operate at different voltages, and thus, must be electrically isolated. For example, consider an application in which a 5V battery powered controller board is configured to control a motor circuit operating at 240V. In this example, it is essential to electrically isolate the 240V motor circuit from the 5V controller circuit, while permitting the 5V controller circuit to send or receive signals from the 240V motor circuit. In this type of application, an isolator may be used to provide voltage and noise isolation, while permitting the information exchange between the two circuit systems. Opto-isolator, also known as optocoupler, is one of the most commonly used galvanic isolators.

Generally, an opto-isolator comprises an optical emitter and an optical receiver. Over time, degradation may occur and optical signals emitted from the optical emitter may become weak, and eventually the optical emitter may fail to function. For many control systems, failure of such optical parts may be vulnerable and may be dangerous as the control systems may be relying on the optical signals to control fast moving motors or machinery parts. It may be desirable to take preventive steps to replace the parts before complete failure, or to address the degradation to prolong the lifetime of the opto-isolators.

BRIEF DESCRIPTION OF THE DRAWINGS

Illustrative embodiments by way of examples, not by way of limitation, are illustrated in the drawings. Throughout the description and drawings, similar reference numbers may be used to identify similar elements. The drawings are for illustrative purpose to assist understanding and may not be drawn per actual scale.

DETAILED DESCRIPTION

Figure 1:
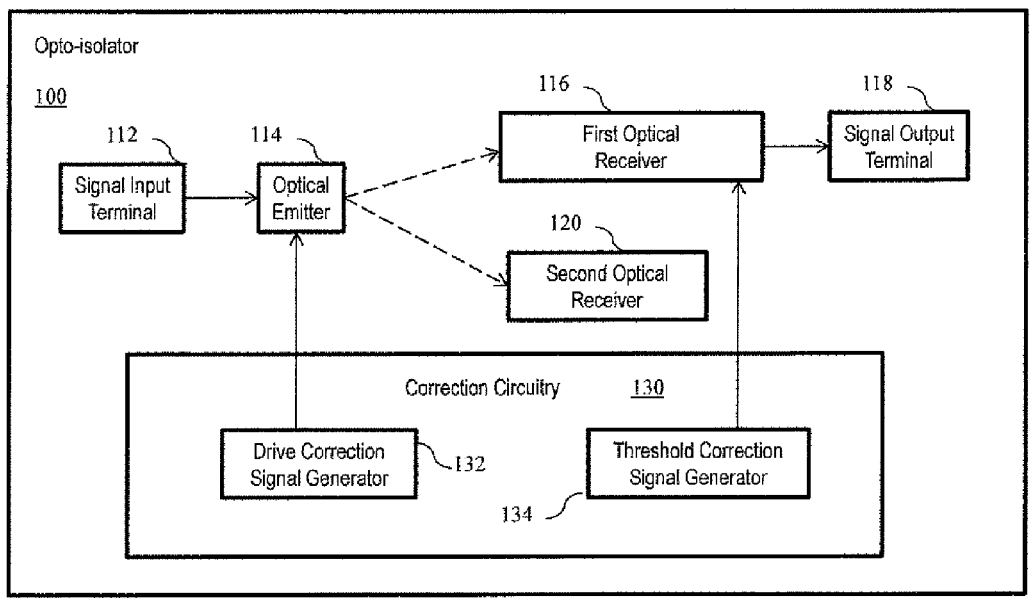
FIG. 1 illustrates a block diagram of an opto-isolator having correction circuitry.

FIG. 1 illustrates a block diagram of an opto-isolator 100 for electrical isolation of an electrical input signal from an electrical output signal. Opto-isolator 100 may comprise a signal input terminal 112 configured to receive the electrical input signal. An optical emitter 114 may be coupled to the signal input terminal 112 and configured to generate emitted light in response to the electrical input signal.

A first optical receiver 116 may be arranged proximate to the optical emitter 114 to receive a first portion of the emitted light. In particular, a first photodetector (not shown) of the first optical receiver 116 may be arranged proximate to the optical emitter 114 to receive the first portion of the emitted light. The first optical receiver 116 may be configured to generate the electrical output signal in response to the first portion of the emitted light. A signal output terminal 118 may be coupled to the first optical receiver 116 to receive the electrical output signal.

Opto-isolator 100 may further comprise a second optical receiver 120 (and/or a second set of optical receivers 120) arranged proximate to the optical emitter 114 to receive a second portion of the emitted light. In particular, a second photodetector (not shown) of the second optical receiver 120 may be arranged proximate to the optical emitter 114 to receive the second portion of the emitted light. In the figures, the first and second portions of emitted light are representatively illustrated by first and second dashed line arrows. The second optical receiver 120 (and/or the second set of optical receivers 120) may be configured to generate one or more light output electrical signals in response to the second portion of the emitted light.

The terms "light" and "optical" as used herein may be visible and/or may be invisible. All possible variations of electromagnetic waves should be taken into consideration when a specific type of light or radiation or optical emitter or optical received is discussed, unless explicitly expressed otherwise. For example, ultra-violet, infrared and other invisible radiation should be included when considering the terms "light" or "optical" as used herein, even though light may often be used in the art to refer to radiation that is visible to the human eye.

Opto-isolator 100 may further comprise correction circuitry 130 configured to generate one or more correction signals. Correction circuitry 130 may be configured to generate one or more correction signals, when a light source of the optical emitter 114 may degrade over time, for example, when light emitted by the light source may degrade below a predetermined level. Correction circuitry 130 may comprise a drive correction signal generator 132 to provide for adjusting drive of the optical emitter. Alternatively or additionally correction circuitry 130 may comprise a threshold correction signal generator 134 to provide for adjusting a threshold of the first optical receiver 116.

In one embodiment, the drive correction signal generator 132 may be coupled with the second optical receiver 120 (and/or one or more members of the second set of optical receivers 120) for receiving one or more of the light output electrical signals therefrom. As the optical emitter 114 may degrade over time, for example, when the light source of the optical emitter 114 may degrade below a predetermined level, one or more of the light output electrical signals may likewise decline below one or more predetermined signal levels. In response to the one or more of the light output electrical signals of the second optical receiver 120 (and/or of one or more members of the second set of optical receivers 120), the drive correction signal generator 132 may generate one or more drive correction signals. The optical emitter 114 may be coupled to the drive correction signal generator 132 for adjusting drive of the optical emitter 114 in response to the one or more drive correction signals.

In one embodiment, the threshold correction signal generator 134 may be coupled with the second optical receiver 120 (and/or another one or more members of the second set of optical receivers 120) for receiving another one or more of the light output electrical signals therefrom. As the optical emitter 114 may degrade over time, for example, when the light source of the optical emitter 114 may degrade below a predetermined level, the another one or more of the light output electrical signals may likewise decline below another one or more predetermined signal levels. In response to the another one or more of the light output electrical signals of the second optical receiver 120 (and/or of another one or more members of the second set of optical receivers 120), the threshold correction signal generator 134 may generate one or more threshold correction signals. The first optical receiver 116 may be coupled to the threshold correction signal generator 134 for adjusting the threshold of the first optical receiver 116 in response to the one or more threshold correction signals.

Figure 2:
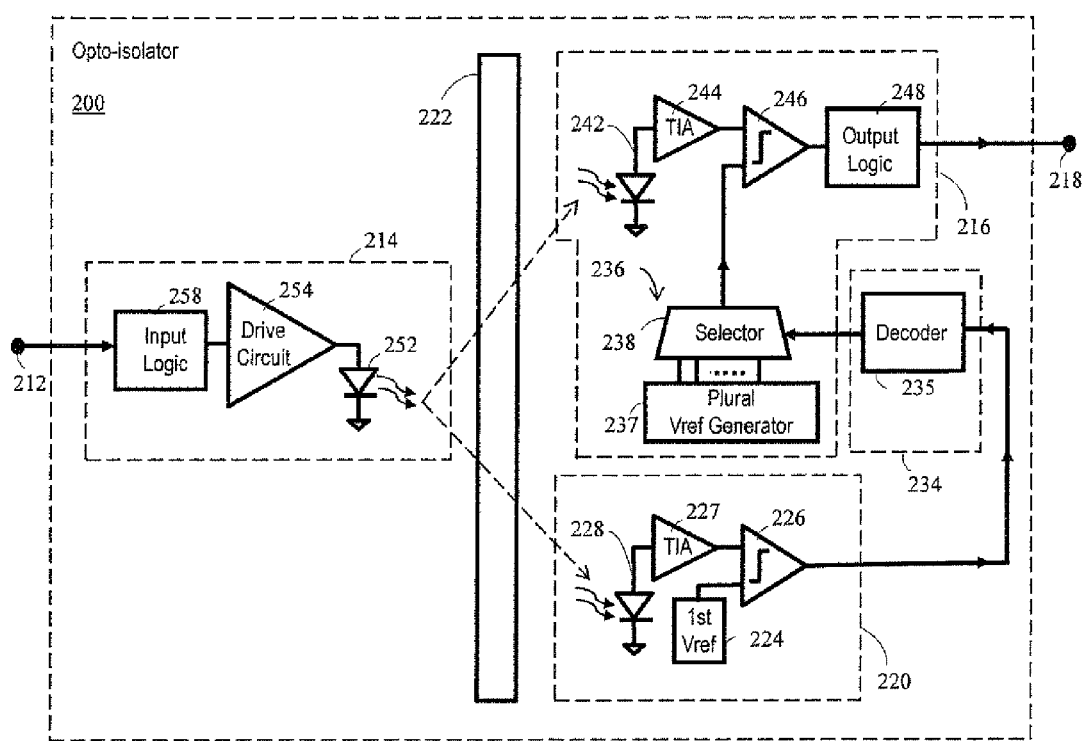
FIG. 2 illustrates a schematic diagram of another opto-isolator embodiment.

FIG. 2 illustrates a schematic diagram of another opto-isolator embodiment 200 for electrical isolation of an electrical input signal from an electrical output signal. Opto-isolator 200 may comprise a signal input terminal 212 configured to receive the electrical input signal. Optical emitter 214 may be coupled to the signal input terminal 212 and configured to generate emitted light in response to the electrical input signal. Optical emitter 214 may comprise a photoemitter 252 (e.g. a Light Emitting Diode 252), which may be coupled with the signal input terminal 212 via a drive circuit 254 and input logic 258.

First optical receiver 216 may comprise first photodetector 242, which may be arranged proximate to the optical emitter 214 to receive a first portion of the emitted light. The first optical receiver 216 may be configured to generate the electrical output signal in response to the first portion of the emitted light. Signal output terminal 218 may be coupled to the first optical receiver 216 to receive the electrical output signal.

Second optical receiver 220 may comprise second photodetector 228, which may be arranged proximate to the optical emitter 214 to receive a second portion of the emitted light. In FIG. 2, the first and second portions of emitted light are representatively illustrated by first and second dashed line arrows. Second photodetector 228 may be configured to generate a light output electrical signal in response to the second portion of the emitted light.

As the optical emitter 214 may degrade over time, for example, when light emitted by the photoemitter 252 may degrade below a predetermined level, the light output electrical signal generated by second photodetector 228 in response thereto may likewise decline below a predetermined signal level. The light output electrical signal from second photodetector 228 may be coupled with a first input of a first comparator 226 via first transimpedance amplifier 227. First comparator 226 may monitor when the light output electrical signal may decline below the predetermined signal level by comparing the light output electrical signal to a first reference signal. The first reference signal may be set so that the first comparator 226 may generate an activating transition of a first comparison signal, when the light output electrical signal may decline below the predetermined signal level.

The second optical receiver 220 may comprise a first reference signal generator 224 configured to generate the first reference signal. Accordingly, it should be understood that the first comparator 226 may be coupled with the first reference signal generator 224 and the second photodetector 228, and may be configured to generate a first comparison signal in response to the first reference signal and the light output electrical signal.

A correction signal generator, e.g. a threshold correction signal generator 234, may be coupled with the first comparator 226, and configured to generate a correction signal, e.g. a threshold correction signal, in response the first comparison signal, as generated by the first comparator 226. Therefore, in accordance with the foregoing discussion, it should be understood that the threshold correction signal generator 234 may generate the threshold correction signal, in response to the light output electrical signal of the second optical receiver 220. The threshold correction signal generator 234 may comprise a decoder 235, which may be configured to decode the first comparison signal, so as to generate the threshold correction signal.

The first optical receiver 216 may be coupled to the threshold correction signal generator 234 for adjusting a threshold of the first optical receiver 216 in response to the threshold correction signal. For example, the threshold of the first optical receiver 216 may be lowered in response to the threshold correction signal. This lowered threshold of the first optical receiver 216 may provide for continuing detection of degraded light, even when light emitted by the photoemitter 252 may degrade below the predetermined level.

In addition to the first photodetector 242, the first optical receiver 216 may further comprise an adjustable reference signal generator 236 having an input coupled with the threshold correction signal generator 234 and configured to generate an adjustable reference signal that adjusts in response to the threshold correction signal. The adjustable reference signal generator 236 may comprise a selector 238 having an input coupled with the threshold correction signal generator 234 for variably selecting from among a plurality reference voltages generated by a plural voltage reference generator 237, so as to provide the adjustable reference signal in response to the threshold correction signal.

A second comparator 246 may have a first input coupled with the first photodetector 242 via a second transimpedance amplifier 244. The second comparator 246 may have a second input coupled with the adjustable reference signal generator 236. The second comparator 246 may be configured to generate a second comparison signal in response to the first photodetector signal and the adjustable reference signal. The first optical receiver 216 may further comprise output logic 248 coupled between signal output terminal 218 and an output of the second comparator 246. The output logic 248 may be configured to generate the electrical output signal of the opto-isolator 200 in response to the second comparison signal.

As shown in FIG. 2, opto-isolator 200 may further comprise an electrical insulator 222. Electrical insulator 222 may be interposed between the optical emitter 214 and the first and second optical receivers 216, 220. Electrical insulator 222 may be configured to electrically isolate the first and second optical receivers 216, 220 from the optical emitter 214. The electrical insulator 222 may be substantially transparent to light emitted by the optical emitter 214. Accordingly, respective first and second photodetectors 242, 228 of each of the first and second optical receivers 216, 220 may receive through the electrical insulator 222 each of the first and second portions of light emitted by the optical emitter 214.

The photoemitter 252 of the optical emitter 214 may comprise a first photoemitter die. The first photodetector 242 of the first optical receiver 216 may comprise a first photodetector die. The second photodetector 228 of the second optical receiver 220 may comprise a second photodetector die. The first photoemitter die and the first and second photodetector dies may be packaged together.

Alternatively, the first and second photodetectors 242, 228 may be integrated onto a single monolithic substrate. To provide for even greater integration, the first and second optical receivers 216, 220 may be integrated onto a single monolithic substrate.

Figure 3:
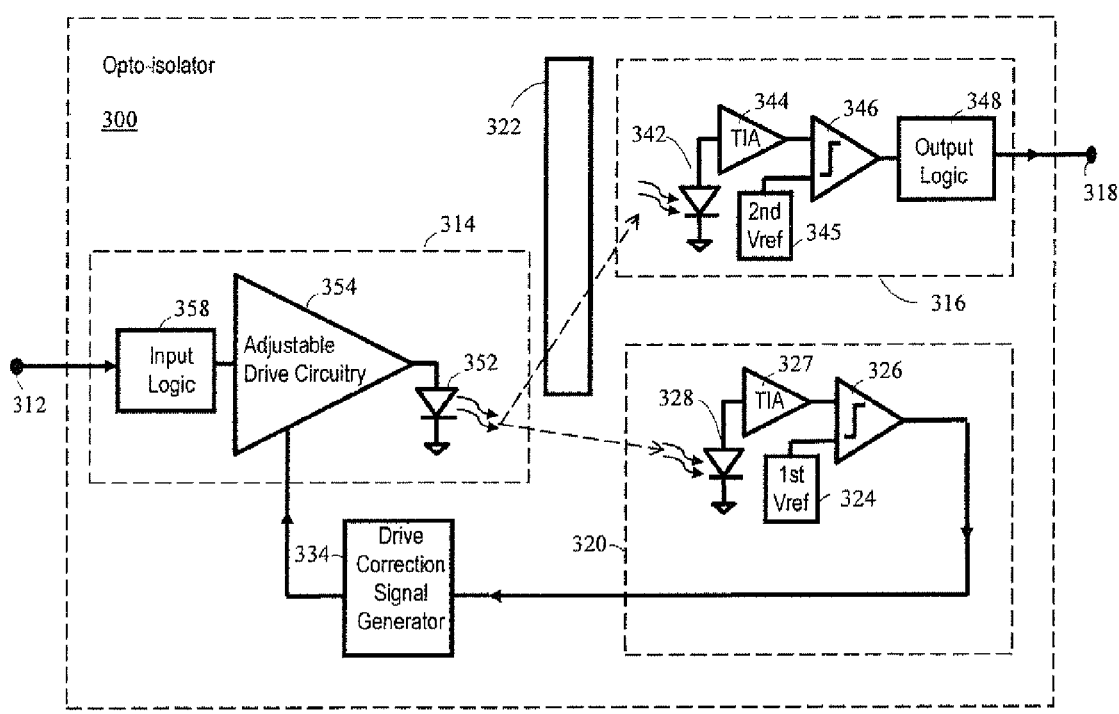
FIG. 3 illustrates a schematic diagram of another opto-isolator embodiment.

FIG. 3 illustrates a schematic diagram of another opto-isolator embodiment 300 for electrical isolation of an electrical input signal from an electrical output signal. Opto-isolator 300 may comprise a signal input terminal 312 configured to receive the electrical input signal. Optical emitter 314 may be coupled to the signal input terminal 312 and configured to generate emitted light in response to the electrical input signal. Optical emitter 314 may comprise a photoemitter 352 (e.g. a Light Emitting Diode 352), which may be coupled with the signal input terminal 312 via an adjustable drive circuitry 354 and input logic 358.

First optical receiver 316 may comprise first photodetector 342, which may be arranged proximate to the optical emitter 314 to receive a first portion of the emitted light. The first optical receiver 316 may be configured to generate the electrical output signal in response to the first portion of the emitted light. Signal output terminal 318 may be coupled to the first optical receiver 316 to receive the electrical output signal.

Second optical receiver 320 may comprise second photodetector 328, which may be arranged proximate to the optical emitter 314 to receive a second portion of the emitted light. In FIG. 3, the first and second portions of emitted light are representatively illustrated by first and second dashed line arrows. Second photodetector 328 may be configured to generate a light output electrical signal in response to the second portion of the emitted light.

As the optical emitter 314 may degrade over time, for example, when light emitted by the photoemitter 352 may degrade below a predetermined level, the light output electrical signal generated by second photodetector 328 in response thereto may likewise decline below a predetermined signal level. The light output electrical signal from second photodetector 328 may be coupled with a first input of a first comparator 326 via first transimpedance amplifier 327. First comparator 326 may monitor when the light output electrical signal may decline below the predetermined signal level by comparing the light output electrical signal to a first reference signal. The first reference signal may be set so that the first comparator 326 may generate an activating transition of a first comparison signal, when the light output electrical signal may decline below the predetermined signal level.

The second optical receiver 320 may comprise a first reference signal generator 324 configured to generate the first reference signal. Accordingly, it should be understood that the first comparator 326 may be coupled with the first reference signal generator 324 and the second photodetector 328, and may be configured to generate a first comparison signal in response to the first reference signal and the light output electrical signal.

A correction signal generator, e.g. a drive correction signal generator 334, may be coupled with the first comparator 326, and configured to generate a correction signal, e.g. a drive correction signal, in response the first comparison signal, as generated by the first comparator 326. Therefore, in accordance with the foregoing discussion, it should be understood that the drive correction signal generator 334 may generate the drive correction signal, in response to the light output electrical signal of the second optical receiver 320. In turn, the adjustable drive circuitry 354 may adjust or may raise or may increase drive of the photoemitter 352 in response to the drive correction signal generated by the drive correction signal generator.

In other words, the adjustable drive circuitry 354 of the optical emitter 314 may be coupled to the drive correction signal generator 334 for adjusting drive of the photoemitter 352 in response to the threshold correction signal. For example, drive of the photoemitter 352 may be raised or may be increased in response to the drive correction signal. This raised or increased drive of the photoemitter 352 may provide for remedying degraded light of the photoemitter 352 by raising or increasing light output of the photoemitter 352, when light emitted by the photoemitter 352 may have degraded below the predetermined level.

In addition to the first photodetector 342, the first optical receiver 316 may further comprise a second reference signal generator 345, which may be configured to generate a second reference signal. A second comparator 346 may have a first input coupled with the first photodetector 342 via a second transimpedance amplifier 344. The second comparator 346 may have a second input coupled with the second reference signal generator 336. The second comparator 346 may be configured to generate a second comparison signal in response to the first photodetector signal and the second reference signal. The first optical receiver 316 may further comprise output logic 348 coupled between signal output terminal 318 and an output of the second comparator 346. The output logic 348 may be configured to generate the electrical output signal of the opto-isolator 300 in response to the second comparison signal.

As shown in FIG. 3, opto-isolator 300 may further comprise an electrical insulator 322. Electrical insulator 322 may be interposed between the optical emitter 314 and the first optical receiver 316. Electrical insulator 322 may be configured to electrically isolate the first optical receiver 316 from the optical emitter 314. In contrast, the second optical receiver 320 may be electrically coupled with the optical emitter 314. The electrical insulator 322 may be configured so as to be limited to electrically isolating the first optical receiver 316 from the optical emitter 314, and so as to avoid electrically isolating the second optical receiver 320 from the optical emitter 314.

The electrical insulator 322 may be substantially transparent to light emitted by the optical emitter 314. Accordingly, as shown in FIG. 3, first photodetector 342 of the first optical receiver 316 may receive through the electrical insulator 322 the first portion of light emitted by the optical emitter 314.

Figure 4:
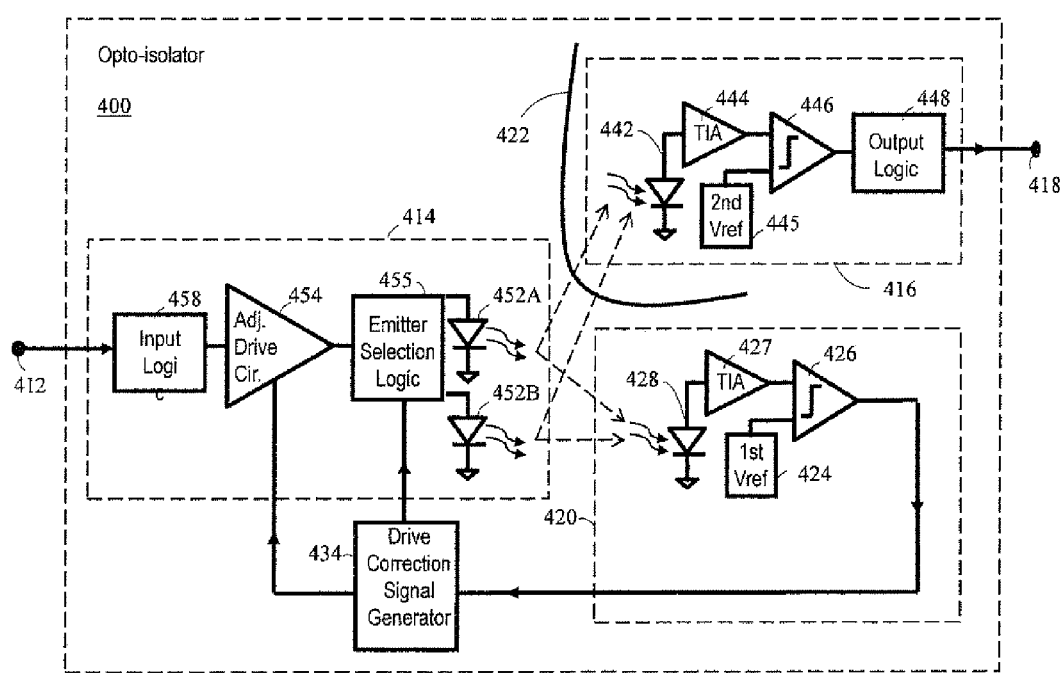
FIG. 4 illustrates a schematic diagram of another opto-isolator embodiment.

FIG. 4 illustrates a schematic diagram of another opto-isolator embodiment 400 for electrical isolation of an electrical input signal from an electrical output signal. Opto-isolator 400 may comprise a signal input terminal 412 configured to receive the electrical input signal. Optical emitter 414 may be coupled to the signal input terminal 412 and configured to generate emitted light in response to the electrical input signal. Optical emitter 414 may comprise first and second photoemitters 452A, 452B (e.g. first and second Light Emitting Diodes 452A, 452B), which may be coupled with the signal input terminal 412 via input logic 458 and an adjustable drive circuit 454 and emitter selection logic 455.

First optical receiver 416 may comprise first photodetector 442, which may be arranged proximate to the optical emitter 414 to receive a first portion of the emitted light. The first optical receiver 416 may be configured to generate the electrical output signal in response to the first portion of the emitted light. Signal output terminal 418 may be coupled to the first optical receiver 416 to receive the electrical output signal.

Second optical receiver 420 may comprise second photodetector 428, which may be arranged proximate to the optical emitter 414 to receive a second portion of the emitted light. In FIG. 4, the first and second portions of emitted light are representatively illustrated by first and second dashed line arrows. Second photodetector 428 may be configured to generate a light output electrical signal in response to the second portion of the emitted light.

As the optical emitter 414 may degrade over time, for example, when light emitted by the first photoemitter 452A may degrade below a predetermined level, the light output electrical signal generated by second photodetector 428 in response thereto may likewise decline below a predetermined signal level. The light output electrical signal from second photodetector 428 may be coupled with a first input of a first comparator 426 via first transimpedance amplifier 427. First comparator 426 may monitor when the light output electrical signal may decline below the predetermined signal level by comparing the light output electrical signal to a first reference signal. The first reference signal may be set so that the first comparator 426 may generate an activating transition of a first comparison signal, when the light output electrical signal may decline below the predetermined signal level.

The second optical receiver 420 may comprise a first reference signal generator 424 configured to generate the first reference signal. Accordingly, it should be understood that the first comparator 426 may be coupled with the first reference signal generator 424 and the second photodetector 428, and may be configured to generate a first comparison signal in response to the first reference signal and the light output electrical signal.

A correction signal generator, e.g. a drive correction signal generator 434, may be coupled with the first comparator 426, and configured to generate a correction signal, e.g. a drive correction signal, in response the first comparison signal, as generated by the first comparator 426. Therefore, in accordance with the foregoing discussion, it should be understood that the drive correction signal generator 434 may generate the drive correction signal, in response to the light output electrical signal of the second optical receiver 420. In turn, emitter selection logic 455 may selectively activate second photoemitter 452B in addition to, or in place of, activation of first photoemitter 452A, when the first photoemitter 452A may have become degraded. Further, the adjustable drive circuitry 454 may adjust or may raise or may increase drive of the photoemitter 452 in response to the drive correction signal generated by the drive correction signal generator.

In other words, emitter selection logic 455 of the optical emitter 414 may be coupled to the drive correction signal generator 434 for selectively activating second photoemitter 452B in addition to, or in place of, activation of first photoemitter 452A, when the first photoemitter 452A may have become degraded. Further, the adjustable drive circuitry 454 of the optical emitter 414 may be coupled to the drive correction signal generator 434 for adjusting drive of one or both of the photoemitters 452A, 452B in response to the threshold correction signal. For example, drive of the one or both of the photoemitters 452A, 452B may be raised or may be increased in response to the drive correction signal. This raised or increased drive of the first photoemitter 452A may provide for remedying degraded light of the first photoemitter 452A by raising or increasing light output of the photoemitter 452A, when light emitted by the first photoemitter 452A may have degraded below the predetermined level. Further, the raised or increased drive of the adjustable drive circuit may provide for remedying degraded light of the first photoemitter 452A by providing drive for the second photoemitter 452B, when light emitted by the first photoemitter 452A may have degraded below the predetermined level.

In addition to the first photodetector 442, the first optical receiver 416 may further comprise a second reference signal generator 445, which may be configured to generate a second reference signal. A second comparator 446 may have a first input coupled with the first photodetector 442 via a second transimpedance amplifier 444. The second comparator 446 may have a second input coupled with the second reference signal generator 436. The second comparator 446 may be configured to generate a second comparison signal in response to the first photodetector signal and the second reference signal. The first optical receiver 416 may further comprise output logic 448 coupled between signal output terminal 418 and an output of the second comparator 446. The output logic 448 may be configured to generate the electrical output signal of the opto-isolator 400 in response to the second comparison signal.

As shown in FIG. 4, opto-isolator 400 may further comprise an electrical insulator 422. Electrical insulator 422 may be interposed between the optical emitter 414 and the first optical receiver 416. Electrical insulator 422 may be configured to electrically isolate the first optical receiver 416 from the optical emitter 414. In contrast, the second optical receiver 420 may be electrically coupled with the optical emitter 414. The electrical insulator 422 may be configured so as to be limited to electrically isolating the first optical receiver 416 from the optical emitter 414, and so as to avoid electrically isolating the second optical receiver 420 from the optical emitter 414.

The electrical insulator 422 may be substantially transparent to light emitted by the optical emitter 414. Accordingly, as shown in FIG. 4, first photodetector 442 of the first optical receiver 416 may receive through the electrical insulator 422 the first portion of light emitted by the optical emitter 414.

Figure 5:
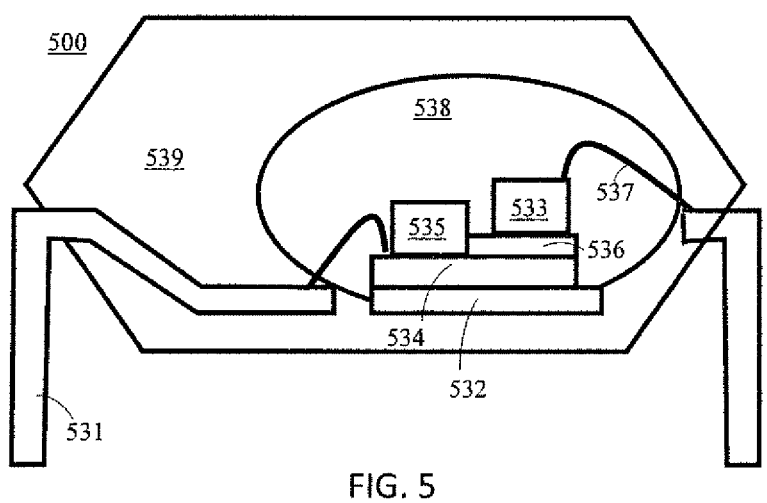
FIG. 5 illustrates a cutaway side view of a packaged opto-isolator.

FIG. 5 illustrates a cutaway side view of a packaged opto-isolator 500. The opto-isolator package 500 may comprise a plurality of leads 531, a die attach pad 532, a photoemitter die 533, a die 534 of a plurality of photodetectors (e.g. photodetector die 534), an optional correction circuit die 535, an electrical isolation layer 536, an encapsulant 538, and an optional opaque encapsulant 539. The die 534 of the plurality of photodetectors (e.g. photodetector die 534) may be integrated onto a single monolithic substrate 534. A portion of one of the leads 531 may be extended to define the die attach pad 532 configured to accommodate the die 534 of the plurality of photodetectors (e.g. photodetector die 534). The die 534 of the plurality of photodetectors (e.g. photodetector die 534) may be larger than the photoemitter die 533, as well as the optional correction circuit die 535. Therefore, the die 534 of the plurality of photodetectors (e.g. photodetector die 534) may be configured to receive the photoemitter die 533 and the optional correction circuit die 535 as shown in FIG. 5.

For the purpose of electrically isolating the die 534 of the plurality of photodetectors (e.g. photodetector die 534) from the photoemitter die 512, the electrical isolation layer 536 may be disposed on the die 534 of the plurality of photodetectors (e.g. photodetector die 534), and subsequently the photoemitter die 533 may be disposed on the electrical isolation layer 536. Alternatively, the photoemitter die 533 and the correction circuit die 535 may be disposed on another one of the plurality of leads 531. In another embodiment, the die 535 may be disposed on the electrical isolation layer 536. However, stacking up the dies 533, 534, 535 as shown in FIG. 5 may reduce space needed for the opto-isolator package 500. The electrical connections between the dies 533, 534 and leads 531 may be established through wire bonds 537.

One of the leads coupled to the photoemitter die 533 may provide a signal input terminal and may be configured to receive the electrical input signal. One of the leads coupled to the die 534 of the plurality of photodetectors (e.g. photodetector die 534) may provide a signal output terminal and may be configured to output the electrical output signal.

The photodetector die attach pad 532 may be arranged proximate to the photoemitter die 533. The photodetector die 533 may be configured to receive the emitted light. The photodetector die 533 may be configured to generate the electrical output signal in response to emitted light. The second photodetector may be configured to generate a light output electrical signal in response to the emitted light. The embodiment shown in FIG. 5 may be a lead frame package, but in another embodiment, the package may comprise a printed circuit board with the plurality of leads 531 being the conductive traces of the printed circuit board.

The encapsulant 538 may be substantially transparent to the light emitted by the photoemitter die 533. The encapsulant 538 may not be transparent to the human eye as the light may include invisible light such as infra-red light as explained earlier. The encapsulant 538 may be silicone, epoxy or any other similar material suitable to encapsulate the photoemitter die 533, the die 534 of the plurality of photodetectors, and the optional correction circuit die 535. The optional opaque encapsulant 539 may be opaque to the light emitted from the photoemitter die 533. In some applications, the light emitted by the photoemitter die 533 may be blocked within the opto-isolator package 500 because the light may become noise to other electronic components (not shown) or to human eyes. For these applications, the encapsulant 538 may be required to be covered by the opaque encapsulant 539.

Different aspects, embodiments or implementations may, but need not, yield one or more of the following advantages. For example, the correction circuitry may extend the service life of the opto-isolator, when the light source of the optical emitter degrades below a predetermined level. Using the threshold correction signal generator may provide for adjusting the threshold of the first optical receiver. Using the drive correction signal generator may provide for adjusting drive of the optical emitter.

Although specific embodiments of the invention have been described and illustrated, the invention is not to be limited to the specific forms or arrangements of parts so described and illustrated. It is to be understood that the illustration and description shall not be interpreted narrowly. For example, the light sources shown may comprise a Light Emitting Diode (LED), but alternatively or additionally may comprise a die with an integrated LED and circuitry or a light source using future technologies. The scope of the invention is to be defined by the claims appended hereto and their equivalents.

What is claimed is:

1. An opto-isolator for electrical isolation of an electrical input signal from an electrical output signal comprising:
    a signal input terminal configured to receive the electrical input signal;
    an optical emitter coupled to the signal input terminal and configured to generate emitted light in response to the electrical input signal;
    a first optical receiver comprising a first photodetector arranged proximate to the optical emitter to receive a first portion of the emitted light, wherein the first optical receiver is configured to generate the electrical output signal in response to the emitted light;
    a signal output terminal coupled to the first optical receiver to receive the electrical output signal;
    a second optical receiver comprising a second photodetector arranged proximate to the optical emitter to receive a second portion of the emitted light, wherein the second optical receiver is configured to generate a light output electrical signal in response to the second portion of the emitted light, wherein the second optical receiver comprises:
        a first reference signal generator configured to generate a first reference signal; and
        a first comparator coupled with the first reference signal generator and the second photodetector, and configured to generate a first comparison signal in response to the first reference signal and the light output electrical signal;
    a correction circuitry coupled with the second optical receiver, the correction circuitry configured to make adjustments when the optical emitter degrades; and
    a threshold correction signal generator coupled with the first comparator and configured to generate a threshold correction signal in response the first comparison signal.

2. An opto-isolator as recited in claim 1 further comprising an electrical insulator interposed between the optical emitter and the first optical receiver and configured to electrically isolate the first optical receiver from the optical emitter.

3. An opto-isolator as recited in claim 1 wherein the second optical receiver is electrically coupled with the optical emitter.

4. An opto-isolator as recited in claim 1 further comprising a correction signal generator coupled with the first comparator and configured to generate a correction signal in response the first comparison signal.

5. An opto-isolator as recited in claim 1 further comprising a drive correction signal generator coupled with the first comparator and configured to generate a drive correction signal in response to the first comparison signal,
    wherein the optical emitter comprises:
    adjustable drive circuitry having a first input coupled with the signal input terminal to receive the electrical input signal, and having a second input coupled with the drive correction signal generator to receive the drive correction signal, wherein the adjustable drive circuitry is configured to generate an adjustable drive signal in response to the electrical input signal and the drive correction signal; and
    a photoemitter coupled to the adjustable drive circuitry and configured to generate the emitted light in response to the adjustable drive signal.

6. An opto-isolator as recited in claim 1, wherein the first optical receiver comprises:
    an adjustable reference signal generator having an input coupled with the threshold correction signal generator and configured to generate an adjustable reference signal that adjusts in response to the threshold correction signal; and
    a second comparator coupled with the second photodetector and the adjustable reference signal generator, and configured to generate a second comparison signal in response to the second photodetector signal and the adjustable reference signal.

7. An opto-isolator as recited in claim 1 wherein the optical emitter comprises first and second photoemitters coupled to the signal input terminal and configured to generate the emitted light in response to the electrical input signal.

8. An opto-isolator as recited in claim 1 wherein the first and second optical receivers are integrated onto a single monolithic substrate.

9. An opto-isolator as recited in claim 1 wherein:
    the optical emitter comprises a first photoemitter die;
    the first optical receiver comprises a first photodetector die;
    the second optical receiver comprises a second photodetector die; and
    the first photoemitter die and the first and second photodetector dies are packaged together.

10. The opto-isolator as recited in claim 6, wherein the threshold correction signal generator comprises a decoder and wherein the decoder is configured to decode the first comparison signal so as to generate the threshold correction signal.

11. An opto-isolator for electrical isolation of an electrical input signal from an electrical output signal comprising:
- a signal input terminal configured to receive the electrical input signal;
- an optical emitter coupled to the signal input terminal and configured to generate emitted light in response to the electrical input signal;
- a first photodetector arranged proximate to the optical emitter to receive a first portion of the emitted light, wherein the first photodetector is configured to generate the electrical output signal in response to the emitted light;
- a signal output terminal coupled to the first photodetector to receive the electrical output signal;
- a second photodetector arranged proximate to the optical emitter to receive a second portion of the emitted light, wherein the second photodetector is configured to generate a light output electrical signal in response to the second portion of the emitted light;
- a first reference signal generator configured to generate a first reference signal; and
- a first comparator coupled with the first reference signal generator and the second photodetector, and configured to generate a first comparison signal in response to the first reference signal and the light output electrical signal;
- a correction circuitry coupled with the second photodetector, the correction circuitry configured to make adjustments when the optical emitter degrades; and
- a threshold correction signal generator coupled with the first comparator and configured to generate a threshold correction signal in response the first comparison signal.

12. The opto-isolator of claim 11, wherein the first photodetector is included in a first optical receiver and wherein the second photodetector is included in a second optical receiver.

13. The opto-isolator of claim 12, further comprising an electrical insulator interposed between the optical emitter and the first optical receiver and configured to electrically isolate the first optical receiver from the optical emitter.

14. The opto-isolator of claim 12, wherein the second optical receiver is electrically coupled with the optical emitter.

15. The opto-isolator of claim 12, further comprising a correction signal generator coupled with the first comparator and configured to generate a correction signal in response the first comparison signal.

16. The opto-isolator of claim 12, further comprising a drive correction signal generator coupled with the first comparator and configured to generate a drive correction signal in response to the first comparison signal,
wherein the optical emitter comprises:
- adjustable drive circuitry having a first input coupled with the signal input terminal to receive the electrical input signal, and having a second input coupled with the drive correction signal generator to receive the drive correction signal, wherein the adjustable drive circuitry is configured to generate an adjustable drive signal in response to the electrical input signal and the drive correction signal; and
- a photoemitter coupled to the adjustable drive circuitry and configured to generate the emitted light in response to the adjustable drive signal.

17. The opto-isolator of claim 12, wherein the first optical receiver comprises:
- an adjustable reference signal generator having an input coupled with the threshold correction signal generator and configured to generate an adjustable reference signal that adjusts in response to the threshold correction signal; and
- a second comparator coupled with the second photodetector and the adjustable reference signal generator, and configured to generate a second comparison signal in response to the second photodetector signal and the adjustable reference signal.

18. The opto-isolator of claim 12, wherein the optical emitter comprises first and second photoemitters coupled to the signal input terminal and configured to generate the emitted light in response to the electrical input signal.

19. The opto-isolator of claim 12, wherein the first and second optical receivers are integrated onto a single monolithic substrate.

20. The opto-isolator of claim 12, wherein:
- the optical emitter comprises a first photoemitter die;
- the first optical receiver comprises a first photodetector die;
- the second optical receiver comprises a second photodetector die; and
- the first photoemitter die and the first and second photodetector dies are packaged together.

21. The opto-isolator of claim 17, wherein the threshold correction signal generator comprises a decoder and wherein the decoder is configured to decode the first comparison signal so as to generate the threshold correction signal.

* * * * *